United States Patent
Oklejas

[11] Patent Number: 6,139,740
[45] Date of Patent: Oct. 31, 2000

[54] APPARATUS FOR IMPROVING EFFICIENCY OF A REVERSE OSMOSIS SYSTEM

[75] Inventor: Robert A. Oklejas, Monroe, Mich.

[73] Assignee: Pump Engineering, Inc., Monroe, Mich.

[21] Appl. No.: 09/273,074

[22] Filed: Mar. 19, 1999

[51] Int. Cl.[7] .......................... B01D 61/06; B01D 61/18
[52] U.S. Cl. .................. 210/321.66; 210/195.1; 210/195.2; 210/252; 210/258; 210/323.1; 210/416.1
[58] Field of Search .................... 210/252, 195.1, 210/195.2, 257.2, 258, 321.6, 321.65, 321.66, 323.1, 416.1, 650, 652; 60/330, 363

[56] References Cited

U.S. PATENT DOCUMENTS

| | | |
|---|---|---|
| 1,609,306 | 12/1926 | Peterson . |
| 2,710,579 | 6/1955 | Kriegbaum . |
| 2,809,590 | 10/1957 | Brown . |
| 3,899,875 | 8/1975 | Oklejas et al. . |
| 3,999,377 | 12/1976 | Oklejas et al. . |
| 4,029,438 | 6/1977 | Sloan . |
| 4,077,220 | 3/1978 | Matthews . |
| 4,208,166 | 6/1980 | Schroeder et al. . |
| 4,227,865 | 10/1980 | Erickson et al. . |
| 4,230,564 | 10/1980 | Keefer . |
| 4,255,081 | 3/1981 | Oklejas et al. . |
| 4,264,285 | 4/1981 | Erickson et al. . |
| 4,391,102 | 7/1983 | Studhalter et al. . |
| 4,830,572 | 5/1989 | Oklejas, Jr. et al. . |
| 4,966,708 | 10/1990 | Oklejas et al. . |
| 4,983,305 | 1/1991 | Oklejas et al. . |
| 5,049,045 | 9/1991 | Oklejas et al. . |
| 5,082,428 | 1/1992 | Oklejas et al. . |
| 5,106,262 | 4/1992 | Oklejas et al. . |
| 5,207,916 | 5/1993 | Goheen et al. .................. 210/321.65 |

*Primary Examiner*—John Kim
*Attorney, Agent, or Firm*—Emch, Schaffer, Schaub & Porcello Co., L.P.A.

[57] ABSTRACT

A reverse osmosis water purification system comprises an impulse turbine operatively connected to a source of water to be purified. A feed pump is connected to the impulse turbine to supply a source of high pressure water to be purified. A first purification membrane chamber is connected to the feed pump to receive a supply of high pressure unpurified water from the feed pump. The first purification membrane chamber has an outlet for discharging purified water and a discharge opening for discharging high pressure unpurified water. A hydraulic turbocharger has a turbine end T and a pump end P. The pump end P has an inlet for receiving the high pressure unpurified water from the first purification membrane chamber and an outlet which discharges the high pressure unpurified water. A second purification membrane member chamber is connected to the outlet of the pump end P of the hydraulic turbocharger for receiving the high pressure unpurified water. The second purification-membrane chamber has an outlet for discharging water purified in the second purification membrane chamber. The second purification membrane chamber has a discharge opening for discharging high pressure unpurified water from the second purification membrane chamber. The discharge opening is connected to the turbine end T of the hydraulic turbocharger and a turbine end T of the impulse turbine. The high pressure unpurified water from the second purification membrane chamber can be used to drive the turbine end T of the impulse turbine and/or the turbine end T of the hydraulic turbocharger to increase the pressure of the water to be purified that is supplied to the first or the second purification membrane chambers.

7 Claims, 5 Drawing Sheets

APPARATUS FOR IMPROVING EFFICIENCY OF A REVERSE OSMOSIS SYSTEM

BACKGROUND OF THE INVENTION

The invention relates to a new and useful power recovery system to reduce the energy requirements of many industrial and liquid purification processes that involve pumping liquid or gases at high pressures. This invention is particularly well-suited for use in reverse osmosis processes which are used to remove salt from sea water. In the reverse osmosis system and other systems in which the invention is particularly well-suited for use, a liquid or gas is pumped at high pressure into a chamber. In the chamber a portion of the liquid or gas is purified or otherwise processed and drawn from the chamber. The remainder of the high pressure gas or liquid is discharged from the chamber as reject that is disposed. The reject is usually at a very high pressure and this pressure must be dissipated through the use of a throttling valve or other device. Usually the throttling valve reduces the pressure in the reject stream to essentially 0 psi so that all of the pressure energy in the reject stream is dissipated and provides no further benefit to the process. These energy losses can be very significant and result in a basic inefficiency in the system. In the use of reverse osmosis methods to remove salt from sea water these high energy costs associated with such an inefficient system have severely limited the commercial applications of the technology.

Several methods have been tried to recover the energy in the reject stream in order to reduce the operating costs of industrial or liquid purification processes. With regard to reverse osmosis systems, pistons with mechanically actuated valves that are positioned in devices resembling steam piston engines have been used. However, these devices have found no commercial acceptance due to the high cost and high maintenance required due to the mechanically complex designs of the system. Furthermore, these systems produce strong shockwaves in the feed flow called water hammer, each time a valve opens or closed resulting in possible damage to components of the reverse osmosis system.

Other systems have used a turbine driven by the high pressure reject that is discharged from the system. The turbine is connected to the motor operating the feed pump. For good efficiency, a turbine must operate at very high speeds, usually exceeding 15,000 rpm. This high speed means that a reducing gear box must be installed between the turbine unit and the feed pump motor to effectively transfer the power from the turbine to the feed pump motor. The reducing gear box is a very expensive piece of equipment and requires a great deal of skill to install and maintain properly. A gear box also requires external means of lubrication further increasing the maintenance costs. It is also possible that the lubrication can contaminate the water that is feed to the reverse osmosis system. High speed seals must also be provided on the shaft between the turbine and the speed reducing gear box. These high speed seals are also expensive and usually not very reliable in field applications. For the above reasons there has been very limited commercial acceptance of this type of power recovery system for use in reverse osmosis processes.

Other methods include the power recovery pump turbine systems which are described in U.S. Pat. Nos. 4,983,305; 4,966,708 and 5,048,045, in which were so invented by the inventor herein and are expressly incorporated by reference here.

SUMMARY OF THE INVENTION

The present invention is directed to an apparatus and a method for recovering energy from an industrial process where a fluid is pumped at a high pressure into the industrial process and at least a portion of the fluid is discharged from the process at a high pressure. The high pressure discharged fluid is directed into the inlet of a turbine. The high pressure discharged fluid causes a turbine impeller mounted on a rotatable shaft to rotate. An impeller of a pump that is mounted on the shaft is also caused to rotate by the rotation of the shaft. The fluid that is to be pumped to the process is directed to the inlet of the pump. The rotating impeller of the pump raises the pressure of the fluid supplied under high pressure to the process and recovers energy from the high pressure fluid discharged from the process.

According to the present invention a feed pump is operatively connected to the impulse turbine to supply a source of high pressure water to be purified.

A first purification membrane chamber is operatively connected to the feed pump for receiving a supply of high pressure unpurified water from the feed pump. The first purification membrane chamber has an outlet for discharging water purified in the first purification membrane chamber. The first purification membrane chamber has a discharge opening for discharging high pressure unpurified water from the first purification membrane chamber.

A hydraulic turbocharger is operatively connected to the discharge opening of the first purification membrane chamber. The turbocharger has a turbine end T and a pump end P. The pump end P has an inlet for receiving the high pressure unpurified water from the first purification membrane chamber, and an outlet which discharges the high pressure unpurified water.

A second purification membrane chamber having an inlet is operatively connected to the outlet of the pump end P of the hydraulic turbocharger for receiving the high pressure unpurified water from the pump end P of the turbocharger. The second purification membrane chamber has an outlet for discharging water purified in the second purification membrane chamber. The second purification membrane chamber has a discharge opening for discharging high pressure unpurified water from the second purification membrane chamber. The discharge opening is operatively connected to the turbine end T of the hydraulic turbocharger and the impulse turbine.

The high pressure unpurified water from the second purification membrane chamber is used to drive the turbine end T of the hydraulic turbocharger to increase the pressure of the water to be purified and the impulse turbine.

Another embodiment of the present invention has an impulse turbine, a feed pump and a hydraulic turbocharger as described above. A purification membrane chamber has an inlet operatively connected to the pump end P of the hydraulic turbocharger for receiving a supply of high pressure unpurified water. The purification membrane chamber has an outlet for discharging water purified in the first membrane chamber. The purification membrane chamber has a discharge opening for discharging high pressure unpurified water discharged from the purification membrane chamber. The discharge opening is operatively connected to the turbine end T of the hydraulic turbocharger and to the impulse turbine. The high pressure unpurified water from the purification membrane chamber is used to drive the turbine end T of the hydraulic turbocharger 11 to increase the pressure of water to be purified and the impulse turbine 11.

The present invention is an improvement over U.S. Pat. No. 4,983,305 which was invented by the inventor herein. The '305 patent describes the use of a hydraulic turbocharger to provide a pressure boost to a brine steam of a two stage reverse osmosis system having at least two purification membrane chambers. The flow and pressure which energized the turbine section of the turbocharger was the reject (brine) of the second stage. Increasing the pressure between the first and second stages provided several advantages. First, the boost pressure increased the water production of the second stage. However, high pressure is required to match the increased osmotic pressure due to the higher salinity of the second stage feed water. Second, the boost pressure substantially balanced the flux rate between the first and second stage membrane, thereby preventing damaging over-production of the first stage membrane. Third, the increased flow velocity decreased the polarization of the water layer at the membrane surface which also increased production of the purified product water. Fourth, the higher pressure and velocity of the interstage boosted system also resulted in lower total dissolved solids of the product water. Lastly, by using a hydraulic turbocharger, the energy necessary to provide the pressure boost was recovered energy from the second stage brine, making this type of reverse osmosis system the most energy efficient on a kw/gal. basis.

When the turbocharger's efficiency becomes high enough, for example about 55%, then a sufficient level of pressure boosting is accomplished in the second stage without having to utilize all of the brine to drive the turbocharger. This remainder of high pressure brine is available for further energy recovery. The most effective method of recovering this brine energy and controlling the two-stage reverse osmosis process is a main object of this invention.

Reverse osmosis water desalination systems are usually designed to produce a constant flow of permeate, or product water. This measurement of the constant flow is the basis for rating and selling a system. However, this desired constant output is subjected to variable inputs such as temperature and salinity changes and membrane aging. These variables require that the reverse osmosis system operate through a range of flow and pressure conditions. The method of controlling a reverse osmosis system to achieve constant product water output with variable feed water inputs and membrane conditions is another object of the invention.

Therefore, it is an object of the invention to provide an increased production of a reverse osmosis desalination plant while achieving the highest energy efficiency.

It is another object of the invention to provide energy recovery pump turbine to utilize waste energy and industrial processes.

These and other objects of the invention will be more fully understood by reading the following detailed description of the invention in combination with the attached drawings.

DESCRIPTION OF THE PREFERRED EMBODIMENT

The invention is directed to a multiple stage reverse osmosis system that can be utilized to reduce the energy requirements of many industrial and liquid purification processes which involve pumping liquid or gases at high pressures. More particularly, the multiple stage reverse osmosis system recovers energy from the high pressure liquid or gas that is discharged from the purification process and uses this energy to pump the liquid or gas at high pressure into the purification process. The features of the invention will be more readily understood by referring to the attached drawings in connection with the following description.

The reverse osmosis system of the present invention is particularly well-suited for use in a process to remove salt from sea water. It should be understood, however, that the multiple stage reverse osmosis system of the present invention can be used to reduce the energy requirements of many industrial and liquid purification processes that involve pumping liquid or gases at high pressures.

Figure 1:
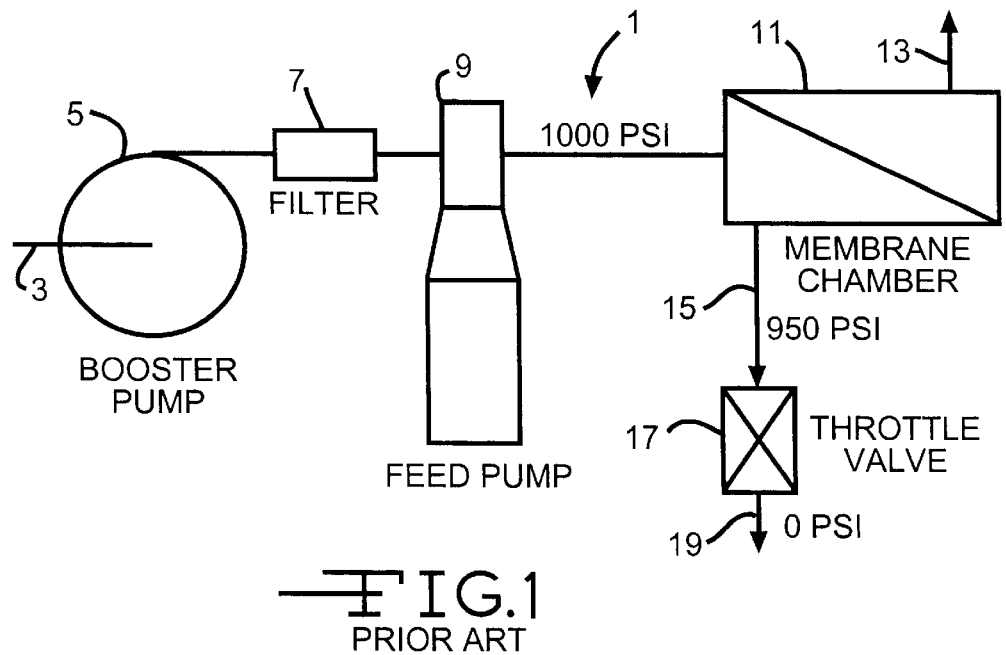
FIG. 1 is a schematic view of a prior art system to purify a liquid.

To better understand the environment in which the multiple stage reverse osmosis system of the present invention can be utilized, it is necessary to describe how a typical reverse osmosis system to remove salt from sea water operates. FIG. 1 shows a typical reverse osmosis system 1 where saltwater passes through an inlet pipe 3 into a booster pump 5. The booster pump increases the pressure of the saltwater to about 25 pounds per square inch and pumps the saltwater through a filter 7 where suspended impurities in the saltwater can be removed. From the filter 7 the saltwater passes into feed pump 9 where the pressure of the saltwater is increased to about 1000 psi. The high pressure (1000 psi) saltwater is then directed into a membrane chamber 11 where salt is removed from at least a portion of the sea water. As an example, if 100 gallons per minute of saltwater is supplied to the membrane chamber 11, approximately 25 gallons per minute of purified water will be produced by the membrane chamber. The purified water is discharged from the membrane chamber at a low pressure through the fresh water discharge line 13. Approximately 75 gallons per minute of concentrated saltwater brine is discharged from the membrane chamber through the brine discharge line 15. The concentrated brine is discharged from the chamber at about 950 psi and this concentrated brine is called the reject. The high pressure reject passes through a throttle valve 17 where the pressure of the concentrated brine reject is reduced so that the reject can be discharged through a waste line 19 for disposal. The pressure of the reject discharged through the waste line 19 is essentially 0 psi. The throttle valve 17 also acts to maintain pressure in the brine discharge line 15 to maintain the proper pressure in the membrane chamber to allow at least a portion of the saltwater to be purified.

In the example cited above for a reverse osmosis purification system the throttle valve lowers the pressure of the concentrated brine reject stream by approximately 950 psi. At a flow rate of 75 gallons per minute for the reject, the hydraulic power dissipated by the throttle valve is about 42 horsepower. This is a great deal of energy that must be put into the system by the feed pump 9 and this energy is effectively lost from the system as the energy is dissipated by the throttle valve 17.

Figure 2:
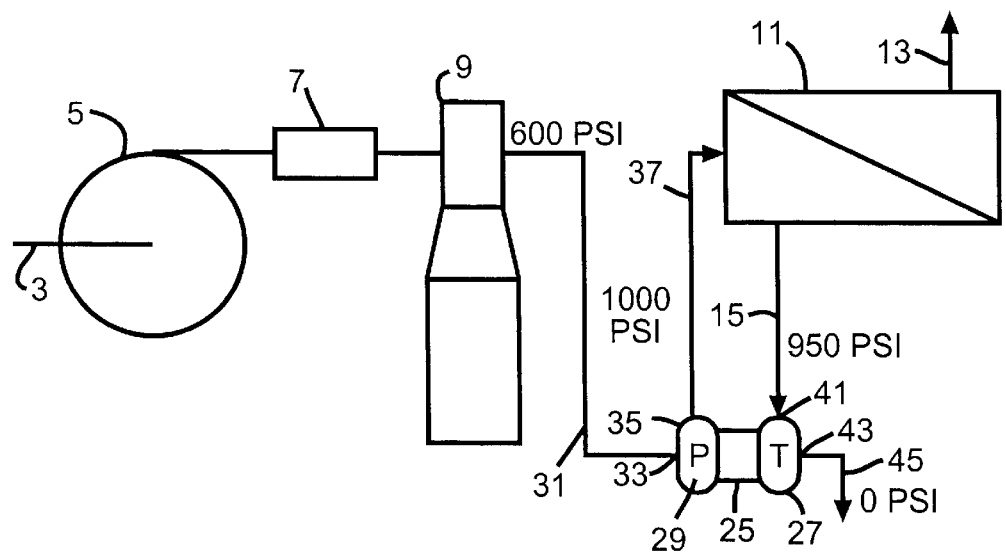
FIG. 2 is a schematic view of a prior art system to purify a liquid.

FIG. 2 shows the reverse osmosis system described in U.S. Pat. Nos. 4,966,708, 4,983,305 and 5,049,045 where a power recovery pump turbine has been installed in the system. This system has essentially the same components as the previously described reverse osmosis system shown in FIG. 1 with the exception that a power recovery pump turbine 25 is operatively connected between the feed pump 9 and the membrane chamber 11 and the power recovery pump turbine 25 is operatively connected to the brine discharge line 15 from the membrane chamber 11. The power recovery pump turbine 25 has a turbine end 27 and a pump end 29. A pipe 31 from the feed pump 9 is connected to a pump inlet 33 on the pump end 29. The sea water passes through the pump inlet 33 through the pump end 29 and is discharged from the pump discharge 35. From the pump discharge 35 the sea water passes through pipe 37 into the membrane chamber 11. The portion of the sea water that is purified by the membrane chamber 11 passes from the chamber through discharge line 13. The concentrated brine reject passes from the membrane chamber 11 through brine discharge line 15. Brine discharge line 15 is operatively connected to a turbine inlet nozzle 41 on the turbine end 27 of the power recovery pump turbine 25. The reject passes through the turbine end 27 and is discharged from the turbine exhaust passage 43. From the turbine exhaust passage 43 the reject passes through waste line 45 and is disposed.

The use of the power recovery pump turbine greatly reduces the pressure increase in the saltwater required to be produced by the feed pump 9 and this significantly reduces the power requirements for the feed pump. Reducing the power requirement for the feed pump has a significant impact on the energy cost for operating the feed pump 9. At the same time the reduced feed pump discharge pressure reduces the stress on the pump and should extend the life of the feed pump. In addition, the concentrated saltwater brine that is discharged through the turbine exhaust passage is at a very low or zero pressure so that the concentrated saltwater brine can be easily disposed of. This eliminates the need for a throttle valve to reduce the pressure of the concentrated saltwater brine that is discharged from the membrane chamber 11.

In reverse osmosis systems it is very important that the rate of the purified water or permeate production be regulated. In such a system, if the permeate flow becomes too high for a given feed flow, the quality of the permeate can decline (i.e., the permeate becomes saltier). Essentially, too large of a quantity of water is forced through the membrane in the membrane chamber of the given feed flow, resulting in greatly increased salinity of the reject stream that is discharged from the membrane chamber. This occurs because more purified water is being extracted from the saltwater supplied to the membrane chamber which increases the salinity of the reject. This increased reject salinity means there is a higher salt passage rate through the membrane thereby increasing salinity of the permeate. On the other hand, if the permeate flow should become too low then the water demands can exceed the permeate flow rate and this is not acceptable. The rate of the permeate production is regulated by controlling the membrane pressure and the rate of feed flow. Normally this regulation is done with a series of valves which must be adjusted by an operator or a computer system in response to changes in the permeate output and quality.

The output of permeate may change for several reasons such as changes in the salinity of the water or the temperature of the water in the feed stream. It is also possible for the membrane to compact after years of use and a compaction of the membrane can also affect the output of permeate. In a reverse osmosis system if the temperature of the sea water decreases, it decreases the effectiveness of the membrane chamber and, for a given membrane pressure and feed flow rate, the output of permeate decreases. Conversely, if the temperature of the saltwater increases, the membrane chamber becomes more permeable and the output of permeate increases. In order to prevent excessive permeate output with warm feed water and insufficient permeate output with cold feed water, the membrane pressure must be actively controlled. However, as set forth above, the valving arrangements utilized in the past require personal attention that is expensive and not always available. Thus, it would be desirable to have a mechanism where the membrane pressure is controlled under changing conditions to produce the desired amount of permeate.

The multiple stage reverse osmosis system of the present invention can be utilized to control the membrane pressure to produce the desired quantity of permeate. The multiple stage reverse osmosis system affects the membrane pressure in two ways: by the amount of boost developed by the pump and by the amount of flow resistance created in the reject line. Focusing on the amount of resistance in the reject line, the multiple stage reverse osmosis system has a unique pressure versus flow relationship ideally suited for reverse osmosis systems. To appreciate the advantages of the multiple stage reverse osmosis system it is helpful to compare this device with conventional ways of controlling membrane pressure. In a normal reverse osmosis system a valve or orifice plate is normally used to control the membrane pressure. The valve or orifice plate creates a flow resistance on the reject line and the valve or orifice plate has a generally square relationship between the membrane pressure and the flow rate. That is, if the flow rate is halved the pressure resistance decreases to one-fourth. In a reverse osmosis system, if the feed temperature increases then the reject flow decreases as more sea water passes through the membrane chamber and becomes permeate. This results in a lower reject flow which reduces the pressure resistance of the valve; however, the reduction is not enough to reduce the membrane pressure and to reduce the production rate of permeate. Therefore, the valve on the reject line must be manually opened or adjusted to obtain the desired membrane pressure to adjust the production rate of the permeate.

The multiple stage reverse osmosis system of the present invention has a different pressure versus flow characteristic that is particularly well-suited for a reverse osmosis system. Specifically, cutting the reject flowing in half results in the pressure resistance decreasing to one-fifth of its former valve rather than one-fourth as with a valve or orifice place. The somewhat lower membrane pressure is, in many cases, sufficient to prevent excess permeate output. For example, if the temperature of the feed water decreases, the flow rate through the reject line increases since less permeate is being produced. The multiple stage reverse osmosis systems will then produce a flow resistance in the reject line that is greater than the pressure increase caused by a valve or orifice plate. The result is that the permeate production does not drop off as much as with a valve or orifice plate. The net effect of using the multiple stage reverse osmosis system is that it reduces over-production of permeate when the feed water temperature increases and minimizes under-production of permeate when the feed water temperature drops. This is done without the intervention by an operator or any auxiliary control system. The same permeate regulation also occurs when the feed water ability or membrane compaction changes.

Figure 3:
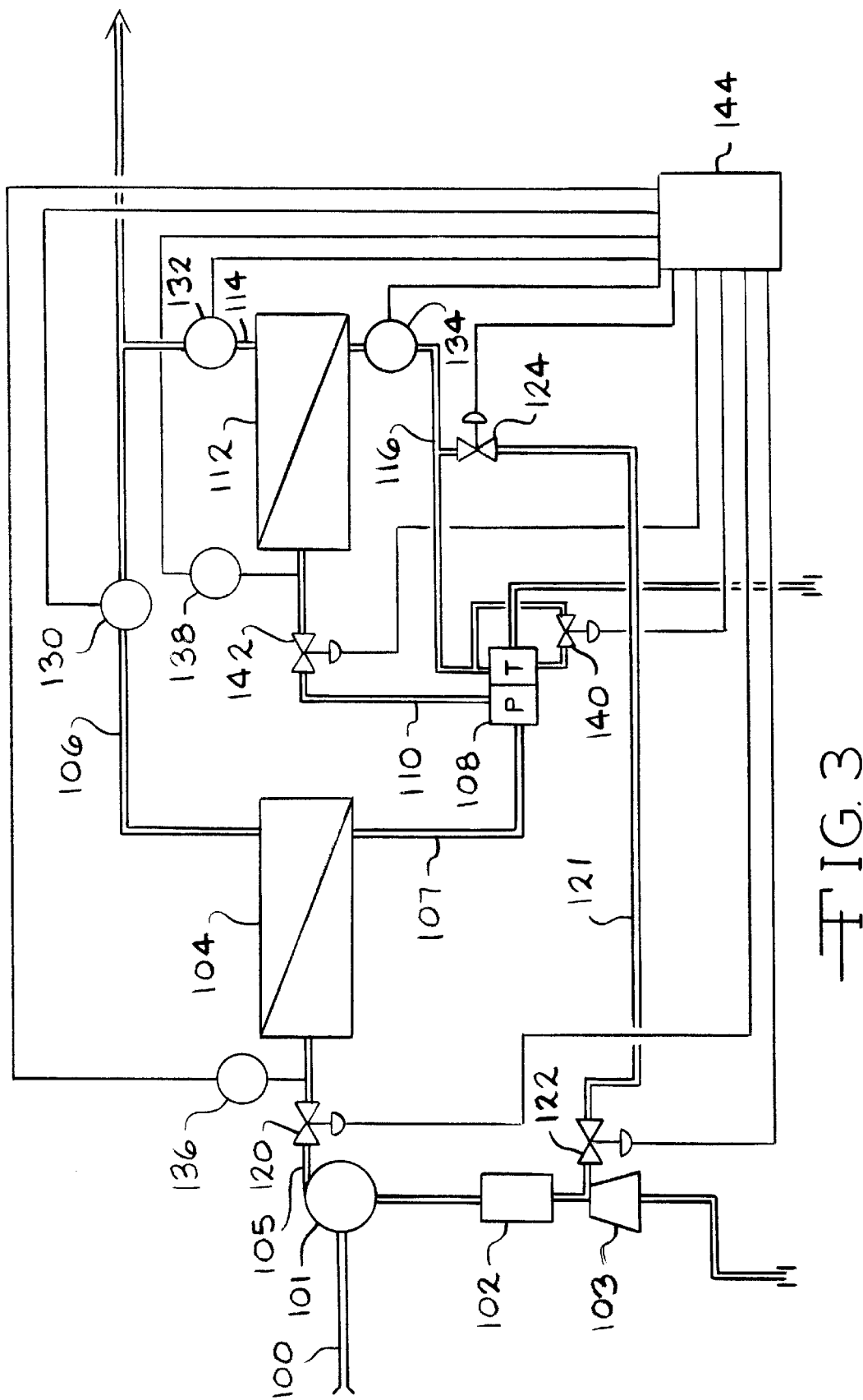
FIG. 3 is a schematic view of a multiple stage reverse osmosis system to purify a liquid.

FIG. 3 show a multiple stage reverse osmosis system where a power recovery pump turbine and an impulse turbine have been installed in the system. Saltwater passes through an inlet pipe 100 into a centrifugal pump 101 which is a high pressure feed pump. The centrifugal pump 101 is driven by an electric motor 102. The electric motor 102 is operatively connected to an impulse turbine 103. The centrifugal pump 101 is in communication with a first stage reverse osmosis membrane chamber 104 through a feed pipe 105 and through a flow control valve 120. The high pressure saltwater is directed into the membrane chamber 104 where salt is removed from at least a portion of the sea water. The purified water is discharged from the membrane chamber 104 at a low pressure through a fresh water discharge line 106. The concentrated brine is discharged from the membrane chamber 104 through a discharge pipe 107. A hydraulic power recovery pump turbine or turbocharger 108, as described in U.S. Pat. Nos. '708, '305 and '045, as discussed above, is in communication with the discharge piping 107. The turbocharger 108 has a turbine end T and a pump end P. The discharge pipe 107 from the first membrane chamber 104 is connected to the pump end P. The reject or brine water passes through the pump end P and is discharged from the turbocharger 108 into a first and second brine piping 110. The piping 110 is operatively connected to a second reverse osmosis membrane chamber 112 where additional salt is removed from the water. The purified water is discharged from the second membrane chamber 112 through a fresh water discharge piping 114. The piping 114 is in communication with the product water piping 106 from the first membrane chamber 104. High pressure concentrated saltwater brine is discharged from the membrane chamber 112 through a second stage brine piping 116. The second stage brine piping 116 is operatively connected to the turbine end T of the hydraulic turbocharger 108.

A branch 121 extends off the second stage brine piping 116 and is in communication with an impulse turbine inlet needle valve 122. A control, or second stage brine by-pass, valve 124 is located on the brine branch piping 121 between the second stage brine piping 116 and the turbine inlet needle valve 122.

The impulse turbine inlet needle valve 122 is operatively connected to the impulse turbine 103.

Additional control instrumentation and valves can be located in the system. For example, a product flow meter 130 is positioned on the first stage product water piping 106. A second product flow meter 132 is positioned on the second stage product water piping 114. A brine flow meter 134 is positioned on the second stage brine piping 116. A pressure gauge 136 is operatively connected adjacent the first stage membrane chamber 104 to measure the first stage feed pressure as the water leaves the centrifugal pump 101 and enters the membrane chamber 104. A pressure gauge 138 is positioned on the hydraulic turbocharger pump side of the membrane chamber 112 to monitor the pressure in the first and second brine piping 110. A hydraulic turbocharger auxiliary nozzle valve 140 is operatively connected to the turbocharger end T of the turbocharger 108.

An additional throttling, or second stage flow control, valve 142 can be operatively positioned on the first and second brine piping 110 between the pump end P of the turbocharger 108 and the second stage reverse osmosis membrane chamber 112. In a preferred embodiment, it is desired to have an automated system where a programmable logic controller 144 is used to control the flow control valve 120, the impulse turbine inlet needle valve 122, the second stage brine by-pass valve 124, the auxiliary nozzle valve 140, and the second stage flow control valve 142. The product flow meter 130, the product flow meter 132, the pressure gauge 136, the pressure gauge 138, and the brine flow meter 134 all provide input signals to the controller 144.

It should be understood that although nearly all large reverse osmosis desalination plants are equipped with automatic process controllers, the above combination of membrane chambers, turbocharger, motors and valves can also be manually operated. It is also within the contemplated scope of the present invention that additional valves can be included for cleaning cycles and system filling and start-up. Alternatively, in other embodiments, smaller and less expense reverse osmosis plants which operate with nearly constant feed conditions, can be adequately controlled with a minimum of instrumentation and valves to the point that the only required valve for practicing this invention is the second stage brine by-pass valve 124. The present invention provides an essential improvement to a reverse osmosis multistage process by incorporating two different kinds of turbines and a load sharing control thereby achieving a desired product output with a minimum of energy.

It is also to be understood to those skilled in art that this invention can be applied to a three stage reverse osmosis system with minor modifications and may also be applied to lower pressure reverse osmosis plants under various circumstances and to other reverse osmosis industrial processes. In addition, the two stage reverse osmosis system is pressurized by a centrifugal pump 101 which can be modified to use a positive displacement pump by eliminating the flow control valve 120.

In operation of the multiple stage reverse osmosis system, saltwater, or feed water enters from a pretreatment system (not shown) through piping 100 into the high pressure centrifugal pump 101. The pressure of the water is raised to an operating pressure of the first stage reverse osmosis membrane chamber 104, which in this example would be approximately 900 psi. The feed water enters the reverse osmosis chamber 104 where a portion of the feed water is purified by the reverse osmosis membrane, rejecting salt passage through the membrane. In this example the portion of the feed water purified is approximately 40% of the total feed flow. This purified water is called the "permeate" or "product water". The permeate leaves the reverse osmosis membrane chamber 104 through the first stage pipe water piping 106 at a low pressure of about 10 to 20 psi. The remainder of the feed water is now increased concentrated brine or reject and leaves the reverse osmosis membrane chamber 104 through the first brine piping 107 at a pressure of about 880 psi. The brine water enters the turbocharger 108 at the pump end P where the pressure is increased to about 1200 to 1300 psi. The higher pressure is desired in order to overcome the higher osmotic pressure of the brine or reject water. The pump end P of the turbocharger 108 passes the increase pressure brine through the first and second stage brine piping 110 into the second stage reverse osmosis membrane chamber 112. About 30% of the brine feed is purified into product water and is discharged from the second stage membrane chamber 112 through the second stage product water piping 114. The remaining 70% of the brine feed is concentrated to an even higher level of dissolved solids. The second stage brine is discharged from the second stage reverse osmosis chamber 112 through the second stage brine piping 116 at a pressure of about 1150 to about 1250 psi and enters the turbine end T of the turbocharger 108. The high pressure brine energy is converted by the turbine end T of the turbocharger into mechanical shaft energy which in turn drives the pump end P of the turbocharger 108, thereby accounting for the pressure boost of the feed water.

When the efficiency of the turbocharger 108 reaches approximately 55%, there is usually more brine energy available than necessary for the turbocharger 108 to achieve the required pressure boast. Until the present invention, the method of controlling the turbocharger pressure output so as not to overboost the second stage reverse osmosis membrane chamber, was to by-pass sufficient brine flow around the turbocharger, thereby achieving the desired membrane pressure in the second stage reverse osmosis chamber. In the past, this by-pass was accomplished by a throttling valve (not shown) which wasted potentially recoverable energy.

The present invention avoids this energy loss by incorporating another type of turbine in this system. The impulse turbine 103 is mechanically coupled to the drive motor 102 and is in hydraulic communication with the branch 121 of the second stage brine piping 116 which is upstream of the turbocharger 108. Any excess brine flow from the second stage reverse osmosis membrane chamber 112 which is not required by the turbocharger 108 is used by the impulse turbine 103 to unload, or supply power to the high pressure pump drive motor 102. In various operating conditions, the brine flow to the impulse turbine can widely vary due to the changing requirements of the turbocharger 108 as the turbocharger 108 responds to the input variability of feed water conditions and membrane conditions. For example, to better understand how variability of feed water can affect a reverse osmosis systems performance, actual operating projections for a two stage reverse osmosis system operating on North Atlantic seawater were examined. In particular, four cases of operating conditions were identified. Most of the variations were due to seasonal temperature changes in the seawater feed to the reverse osmosis system. Table 1 below provides the results of the four cases showing different operating conditions.

9) $IT_{HP}$(impulse turbine horse power)=$WHP \times N_{IT}$

Case 1
$R = 528.4/792.5 = 0.66675$
$P_{BABL} = P_{B2} \times N \times R$
Boost=$P_{BABL} = 1276 \times 0.55 \times 0.66675$
$P_{BABL} = 467.9$
$R_{BRQUD} = P_{BRQUD}/P_{B2}N$
$R = 391.5/1276(0.55) = 0.557851$
$Q_{EX} = Q_{B2} - R(Q_B)$
$Q_{EX} = 528.4 - 0.557851(792.5)$
$Q_{EX} = 528.4 - 442.0969175$
$Q_{EX} = 86.3$
$P = 0.000583 \times P_{B2} \times Q_{EX} \times E$
$P = 0.000583 \times 1276 \times 86.3 \times 0.85$
$P = 54.6$ Case 2
$R = 528.4/792.5 = 0.66675$
$P_{BABL} = P_{B2} \times N \times R$
Boost=$P_{BABL} = 1276 \times 0.55 \times 0.66675$
$P_{BABL} = 467.9$
$R_{BRQUD} = P_{BRQUD}/P_{B2}N$
$R = 319/1276 \times 0.55 = 0.454545$
$Q_{EX} = Q_{B2} - R(Q_B)$
$Q_{EX} = 528.4 - 0.454545(792.5)$
$Q_{EX} = 528.4 - 360.2269$
$Q_{EX} = 168.2$

TABLE 1

|  | 1 $Q_B$ | 2 $P_{M2}$ | 3 $Q_{B2}$ | 4 $P_{B2}$ | 5 $P_E$ | 6 $P_{BRQUD}$ | 7 $P_{BABL}$ | 8 $Q_{EX}$ | 9 $IT_{HP}$ |
|---|---|---|---|---|---|---|---|---|---|
| Case 1 | 792.5 | 1305 | 528.4 | 1276 | 5 | 391.5 | 467.9 | 86.3 | 54.6 |
| Case 2 | 792.5 | 1305 | 528.4 | 1276 | 5 | 319 | 467.9 | 168.2 | 106.4 |
| Case 3 | 634 | 1116.5 | 475.5 | 1102 | 5 | 203 | 454.6 | 263.2 | 143.7 |
| Case 4 | 634 | 1116.5 | 475.5 | 1102 | 5 | 130.5 | 454.6 | 339.0 | 185.1 |

$Q_B$ = first stage brine flow in GPM.
$P_{M2}$ = second stage membrane pressure in psi.
$Q_{B2}$ = second stage membrane flow in GPM.
$P_{B2}$ = second stage brine pressure in psi.
$P_E$ = hydraulic turbocharger exhaust pressure in psi.
$P_{BRQUB}$ = pressure boost required to meet second stage conditions in psi.
$P_{BABL}$ = boost pressure available if all brine is routed to hydraulic turbocharger and is used to boost second stage pressure in psi.
$Q_{EX}$ = excess bring flow in GPM that is not required by hydraulic turbocharger to meet second stage membrane pressure requirements.
$IT_H$ = impulse turbine horse power.

Assumptions:
 1) No pipe losses
 2) Turbo efficiency of 55%
 3) Turbine efficiency of 85%
Equations:
 1) $P_{BRQUD}$=Boost Required
 2) $P_{BABL}$=Boost Available
 3) Boost=$P_B \times N \times R$
 4) R=Reject Ratio=Brine Flow/Feed Flow
 $R_{BRQUD} = (P_{BRQUD}/P_{BABL} \times Q_{P2})Q_B$  $R_{BRQUD}$=Required Reject Ratio
 6) WHP=$0.000583 \times P_{B2} \times Q_{ex}$ necessary to generate $P_{BRQUD}$
 WHP=Water horse power
 7) N=Efficiency of hydraulic turbocharger (HTC)
 8) $N_{IT}$=Efficiency of impulse turbine $P = 0.000583 \times P_{B2} \times Q_{EX} \times E$
$P = 0.000583 \times 1276 \times 168.2 \times 0.85$
$P = 106.4$ Case 3
$R = 475.5/634 = 0.75$
$P_{BABL} = P_{B2} \times N \times R$
Boost=$P_{BABL} = 1102(0.55)(0.75)$
$P_{BABL} = 454.6$
$R_{BRQUD} = P_{BRQUD}/P_{B2}N$
$R = 203/(1102)(0.55) = 0.334928$
$Q_{EX} = Q_{B2} - R(Q_B)$
$Q_{EX} = 475.5 - 0.334928(634)$
$Q_{EX} = 475.5 - 212.344352$
$Q_{EX} = 263.2$
$P = 0.000583 \times P_{B2} \times Q_{EX} \times E$ P=0.000583×1102×263.2×0.85
P=143.7
Case 4
R=475.5/634=0.75
$P_{BABL}=P_{B2} \times N \times R$
Boost=$P_{BABL}$=1102(0.55)(0.75)
$P_{BABL}$=454.6
$R_{BRQUD}=P_{BRQUD}/P_{B2}N$
R=130.5/1102(0.55)=0.215311
$Q_{EX}=Q_{B2}-R(Q_B)$
$Q_{EX}$=475.5−0.215311(634)
$Q_{EX}$=475.5−136.507174
$Q_{EX}$=339.0
P=0.000583×1102×339.0×0.85
P=185.1

Note that the first stage brine flow (column 1, which is also the second stage feed flow) ranges from 634 to 792 gpm; the second stage brine flow (column 3) ranges from 475 to 528 gpm; the second stage membrane operating pressure (column 2) ranges from 1116 to 1305 psi;

and desired turbo pressure boosts (column 6) are 130, 203, 319, and 391 psi.

Column 8 shows the amount of brine flow in excess of that required by the turbocharger 108 to achieve desired pressure boost of column 6.

Column 7 shows the amount of pressure boost available if all the brine stream is used by the turbocharger 108. Column 9 shows the mechanical shaft power output of the impulse turbine 103.

Columns 4 and 5 are second stage brine pressure and turbocharger exhaust pressure, respectively.

Cases 1 and 2 show cold feed water conditions, while Cases 3 and 4 show warmer feed water conditions. As the data indicate, the colder feed water requires higher operating pressures and produces more brine from the first stage. The opposite is true for the warmer feed conditions. Salinity changes also causes similar affects; i.e., higher salinity causes higher pressures and higher reject ratio (proportion of brine flow divided by total flow). The control system must maintain the desired constant product flow at an acceptable water quality (where total dissolved solids level is below 500 ppm), utilizing the least amount of energy while input feed conditions are varying over a range of values.

In this example the system uses the centrifugal high pressure feed pump 101 and the flow control valve 120. Using Case 2 as an initial condition and proceeding to case 3, the following sequence of events will happen. As the feed water temperature increases to Case 3, the first stage membrane chamber 104 response will be to over produce permeate. This over production is damaging to the membrane and also reduces water quality, that is increased total dissolved solids. To prevent over production, the first stage membrane pressure should be reduced. The product flow member's 130 signal to the controller 144 will cause the controller 144 to close the flow control valve 120, thereby decreasing feed flow to the first stage membrane chamber 104. At the same time, the second stage brine bypass valve 124 will be opened to allow greater flow, which, in turn, reduces the system pressure resistance.

As column 1 indicates, the interstage brine flow is reduced from 792 to 634 gpm. At the same time, the second stage membrane pressure requirement has been reduced from 1305 to 1116 psi and second stage brine flow has been reduced from 528 to 475 gpm. To reach the new pressure and flow, controller 144 must open by-pass valve 124 until the desired point is obtained. By-pass flow to the impulse turbine 103 increases from 168 to 263 gpm. Impulse turbine power output likewise increases from 106 to 144 hp. Concurrently with the signal to the by-pass valve 134 to open for greater flow to the impulse turbine 103, the controller 144 signals the impulse turbine inlet needle valve 122 on the impulse turbine 103 to open to accommodate the increased flow.

Figure 4:
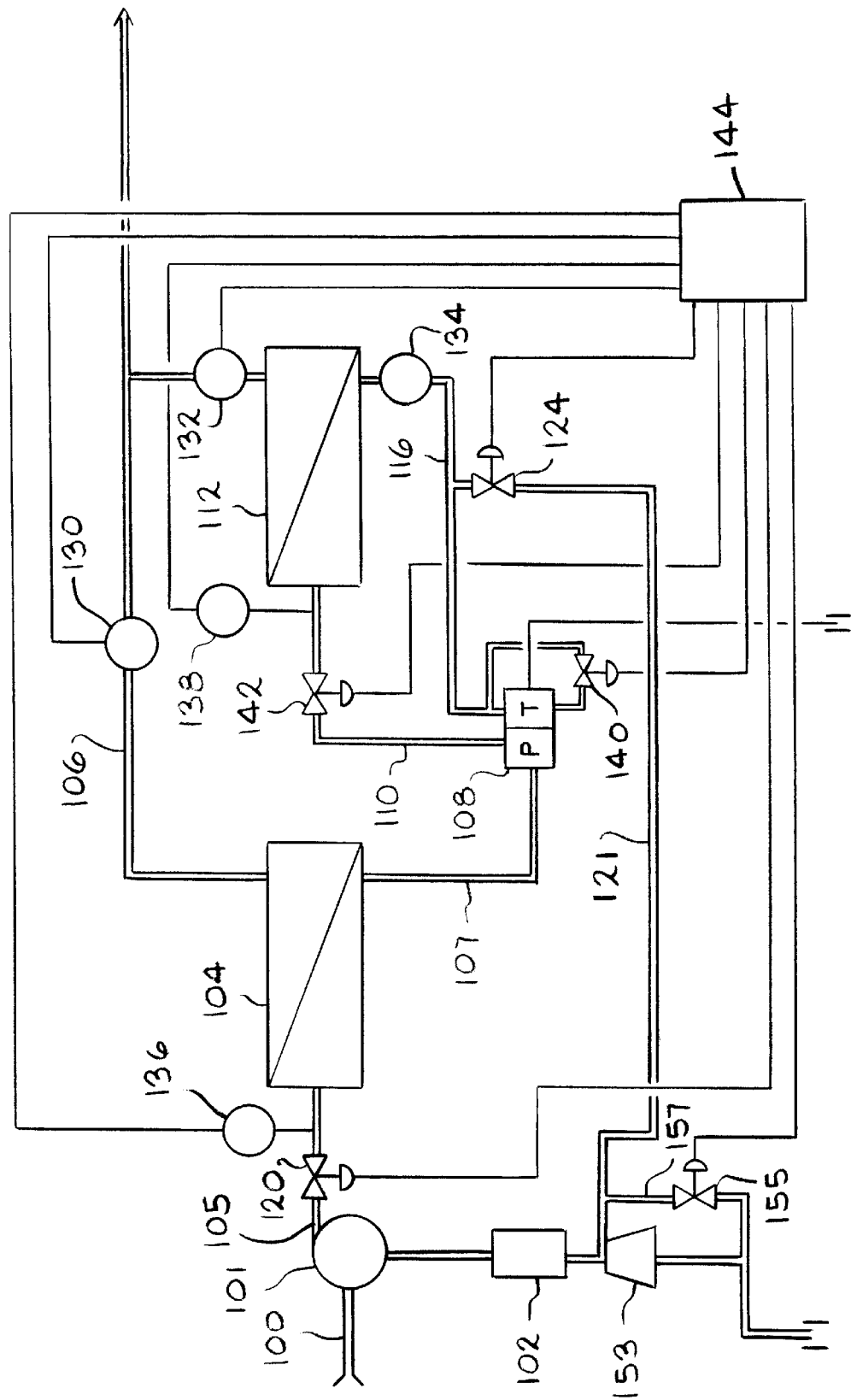
FIG. 4 is another embodiment of the present invention.
Figure 5:
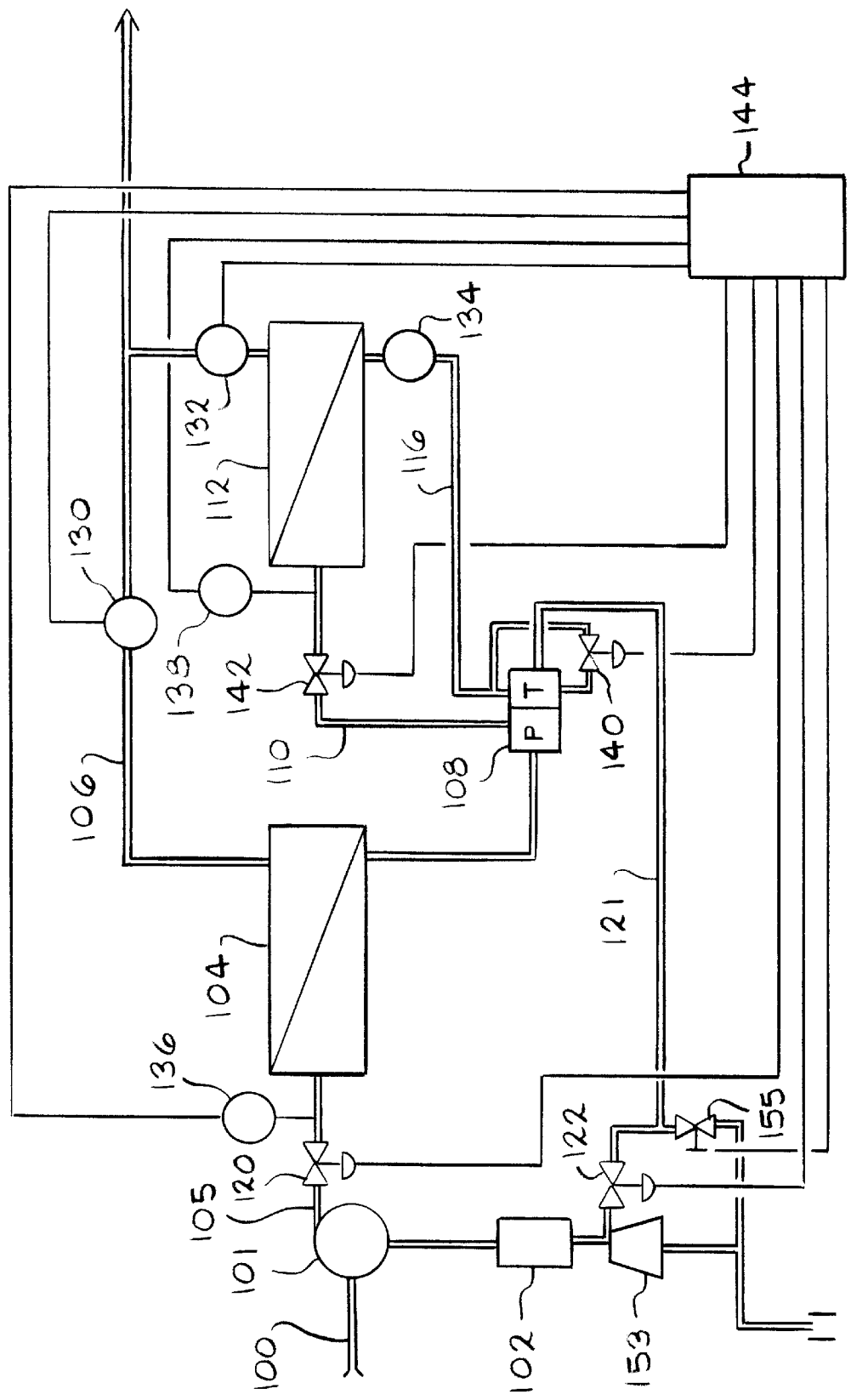
FIG. 5 is another embodiment of the present invention.

FIG. 4 shows another multiple stage reverse osmosis system of the present invention which also utilizes a first stage membrane chamber 104, a second stage membrane chamber 112, and a turbocharger 108, as shown in FIG. 3. Since the arrangement of the chambers and the plumbing connections for the various membrane chambers are essentially the same as previously described for FIG. 3, the description will not be repeated. The difference between the system shown in FIG. 3 and the system of FIG. 4 is that a reverse running pump turbine 153 is used in place of the impulse turbine 103. The reverse running pump turbine 153 can operate either in parallel, as shown in FIG. 4, or in series, as shown in FIG. 5, with the turbocharger 108. In both the embodiments shown in FIGS. 4 and 5, the principle of operation is the same. Excess flow and pressure energy not required by the turbocharger 108 for pressure boosting is utilized by the reverse running pump turbine 153. As shown in FIG. 4, the reverse running pump turbine 153 utilizes the second stage by-pass flow valve 124 to control the amount of brine flow to the reverse running pump turbine 153. In the embodiment shown in FIG. 4, there is no need for an impulse turbine inlet needle valve 122. The embodiment shown in FIG. 4 does have a by-pass valve 155 which is operatively connected to the branch 121 of the second stage brine piping by a branch 157.

In FIG. 5 which shows a series configuration, where use of the reverse running pump turbine 153 relies on the impulse turbine inlet needle valve 122, which is operatively connected between the turbine exhaust end of the hydraulic turbocharger 108 and the reverse running pump turbine 153. The series configuration shown in FIG. 5, further includes a second by-pass valve 155 which is operatively connected to the branch 121 of the second phase piping.

Figure 6:
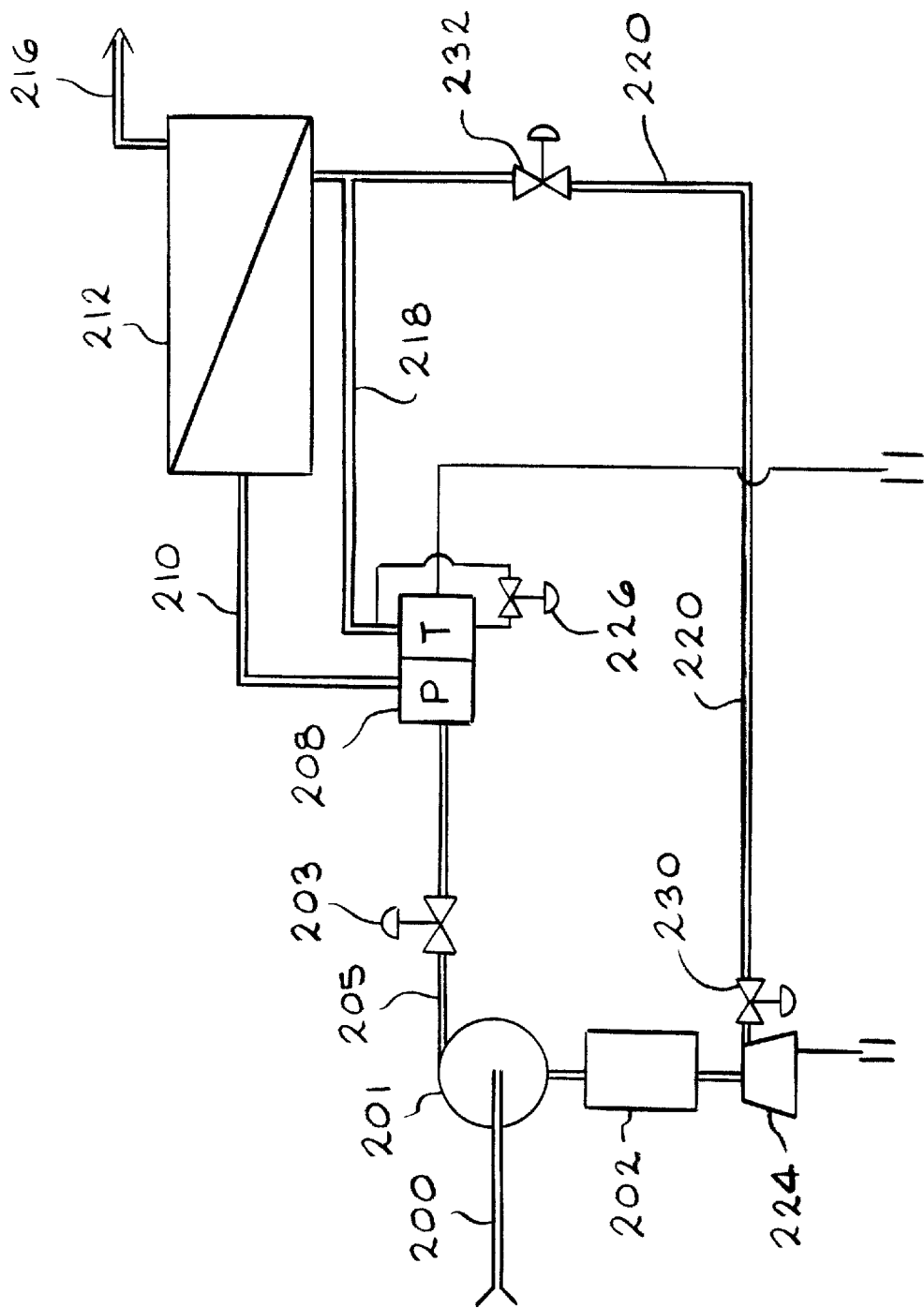
FIG. 6 is another embodiment of the present invention.

FIG. 6 shows a further embodiment of the present invention using two different energy recovery turbines and a control. valve to maximize energy efficiency of a reverse osmosis system. FIG. 6 shows an inlet pipe 200 operatively connected to a high pressure pump 201. An electric drive motor 202 is connected to the high pressure pump 201 and is in hydraulic communication through a pipe 205 with a feed control valve 203. The feed control valve 203 is in communication with a hydraulic turbocharger 208. The hydraulic turbocharger 208 is in communication through a piping 210 with a reverse osmosis membrane chamber 212.

The turbocharger 208 has a pump end P and a turbine end T. Purified waters are discharged from the reverse osmosis membrane chamber 212 through a piping 216. Brine or reject is discharged from the reverse osmosis membrane chamber 212 through a piping 218. The brine piping 218 is operatively connected to the turbine end T of the turbocharger 208. A pipe 220 branches off the pipe 218 and communicates with an impulse turbine engine 224. In this embodiment it is shown that the turbocharger 208 has a turbocharger auxiliary valve 226.

A variable area needle valve 230 is operatively connected to the brine side of the reverse osmosis membrane chamber 212 by the branch 220. The variable area needle valve 230 converts and controls the pressure energy of the brine stream into the high velocity jet required by the impulse turbine 224. In various embodiments it is understood that an additional valve 232 can be positioned between the variable area needle valve 230 and the brine side of the reverse osmosis membrane chamber 212 to provide either equipment isolation or additional control of the system.

An example of how the system operates is shown as follows: An initial operating condition for a reverse osmosis system has a 1000 gpm feed flow, 800 psi membrane pressure, 600 gpm brine flow, and 750 psi brine pressure. The final end of membrane life condition is 1000 gpm feed flow, 1000 psi membrane pressure, 600 gpm brine flow, and 950 psi brine pressure. A properly sized feed pump for this system with the turbocharger 208 would have a capacity of 1000 gpm at a differential pressure of 640 psi. The pump discharge pressure is sized for the highest anticipated pressure required, which is 640 psi. The pressure boost provided by the turbocharger at the 1000 psi condition will be about 360 psi. At the 800 psi condition, the turbo boost will be 288 psi. This means that the required pump discharge pressure at the 800 psi condition is 512 psi. Thus, around 128 psi of pressure is being throttled in the flow control valve. In the present invention, at the initial membrane condition of 800 psi operation, brine flow is diverted from the turbocharger to a level that allows the turbo to produce a 160 psi pressure boost. The diverted flow is admitted to the nozzle valve 230 of the impulse turbine 224. The amount of brine required by the turbocharger 208 is approximately 375 gpm. The other 225 gpm is available to the impulse turbine 224 and represents, at a turbine efficiency of 0.85, an additional 83 hp of recovered energy. As the membranes age and more pressure is required to maintain production of permeate, the variable area nozzle 230 of the impulse turbine 224 will be closed thereby making available to the turbocharger 208 the necessary brine water for achieving the proper pressure.

A comparison of the overall energy rate of the system follows: Assume centrifugal feed pump efficiency of 0.75, HTC hydraulic transfer efficiency of 0.6 at the end of membrane life condition and 0.55 at maximum diversion condition, and an impulse turbine efficiency of 0.85.

|  | TURBO ONLY Pump hp, motor hp | | TURBO AND IMP. TURBINE pump hp, motor hp add savings | | |
| --- | --- | --- | --- | --- | --- |
| 800 psi | 774 | 827 | 774 | 691 | 83 hp |
| 1000 psi | 774 | 827 | 774 | 827 | at this point no flow to impulse turbine |

Assuming the membrane pressure change occurred at an even rate over a four year period, then the total saving (at 8000 hours/year) would be approximately 332,000 kw/hr.

It is to be understood that other types of energy recovery turbines such as reverse running pump turbines can be used as the secondary energy recovery device instead of an impulse turbine. In certain embodiments, however, the impulse type turbine has the best variable capacity performance and so is the most suited for this system.

The above description of the invention is given for the sake of explanation. Various modifications and substitutions, other than those cited, can be made without departing from the scope of the invention as defined by the following claims.

I claim:

1. A reverse osmosis water purification system comprising
a source of water to be purified;
an impulse turbine (103) for providing energy recovery;
a feed pump (101) being operatively connected to the impulse turbine (103) to supply a source of high pressure water to be purified;
a first purification membrane chamber (104) having an inlet operatively connected to the feed pump for receiving a supply of high pressure unpurified water from the feed pump (101), the first purification membrane chamber (104) having an outlet for discharging water purified in the first purification membrane chamber (104), the first purification membrane chamber (104) having a discharge opening for discharging high pressure unpurified water from the first purification membrane chamber (104);
a hydraulic turbocharger (108) having a turbine end T and a pump end P, the pump end P having an inlet for receiving the high pressure unpurified water from the first purification membrane chamber (104), and an outlet which discharges the high pressure unpurified water;
a second purification membrane member chamber (112) having an inlet operatively connected to the outlet of the pump end P of the hydraulic turbocharger (108) for receiving the high pressure unpurified water from the pump end P of the turbocharger (108), the second purification membrane chamber (112) having an outlet for discharging water purified in the second purification membrane chamber (112), the second purification membrane chamber (112) having a discharge opening for discharging high pressure unpurified water from the second purification membrane chamber (112), the discharge opening being operatively connected to the turbine end T of the hydraulic turbocharger (108) and the impulse turbine (103),
whereby the high pressure unpurified water from the second purification membrane chamber (112) can be used to drive the turbine end T of the hydraulic turbocharger (108) and/or the impulse turbine (103) to increase the pressure of the water to be purified that is supplied to the first (104) or the second (112) purification membrane chambers.

2. The reverse osmosis water purification system of claim 1, wherein a second stage brine by-pass valve (124) is positioned between the second purification membrane chamber (112) and the impulse turbine (103).

3. The water purification system of claim 1, wherein an impulse turbine inlet needle valve (122) is positioned between the second purification membrane chamber (112) and the hydraulic impulse turbine (103).

4. The reverse osmosis water purification system of claim 1, wherein the impulse turbine (103) is operatively connected in a parallel configuration with a by-pass valve (124) and the feed pump (101).

5. A reverse osmosis water purification system comprising
a source of water to be purified;
a reverse running pump turbine (153) for providing energy recovery;
a feed pump (101) being operatively connected to the turbine (153) to supply a source of high pressure water to be purified;
a first purification membrane chamber (104) having an inlet operatively connected to the feed pump (101) for receiving a supply of high pressure unpurified water from the feed pump (101), the first purification membrane chamber (104) having an outlet for discharging water purified in the first purification membrane chamber (104), the first purification membrane chamber (104) having a discharge opening for discharging high pressure unpurified water from the first purification membrane chamber (104);

a hydraulic turbocharger (108) having a turbine end T and a pump end P, the pump end P having an inlet for receiving the high pressure unpurified water from the first purification membrane chamber (104), and an outlet which discharges the high pressure unpurified water;

a second purification membrane member chamber (112) having an inlet operatively connected to the outlet of the pump end P of the hydraulic turbocharger (108) for receiving the high pressure unpurified water from the pump end P of the turbocharger (108), the second purification membrane chamber (112) having an outlet for discharging water purified in the second purification membrane chamber (112), the second purification membrane chamber (112) having a discharge opening for discharging high pressure unpurified water from the second purification membrane chamber (112), the discharge opening being operatively connected to the turbine end T of the hydraulic turbocharger (108) and the turbine (153), whereby the high pressure unpurified water from the second purification membrane chamber (112) can be used to drive the turbine end T of the hydraulic turbocharger (108) and/or the turbine (153) to increase the pressure of the water to be purified that is supplied to the first (104) or the second (112) purification membrane chambers;

wherein the turbine (153) is operatively connected in a series configuration with an impulse turbine inlet needle valve (122) and the feed pump (101).

6. A reverse osmosis water purification system comprising:

a source of water to be purified;

an impulse turbine (224) for providing energy recovery;

a feed pump (201) operatively connected to the impulse turbine to supply a source of high pressure water to be purified;

a hydraulic turbocharger (208) having a power recovery pump turbine T and a pump end P, the pump end P having an inlet for receiving a supply of unpurified water from the feed pump (201) and an outlet which discharges the high pressure unpurified water;

a purification membrane chamber (212) having an inlet operatively connected to the pump end P of the hydraulic turbocharger (208) for receiving a supply of high pressure unpurified water, the purification membrane chamber (212) having an outlet for discharging water purified in the first membrane chamber (212), the purification membrane chamber (212) having a discharge opening for discharging high pressure unpurified water discharged from the purification membrane chamber (212), the discharge opening being operatively connected to the turbine end T of the hydraulic turbocharger (208) and the impulse turbine (224), whereby the high pressure unpurified water from the purification membrane chamber (212) can be used to drive the turbine end T of the hydraulic turbocharger (208) to increase the pressure of water to be purified that is supplied to the purification membrane chamber (212) and/or to drive the impulse turbine (224) to provide a portion of the energy needed to drive the feed pump (201).

7. The reverse osmosis water purification system of claim 6, wherein a variable area needle valve (230) is positioned between the impulse turbine (224) and purification membrane chamber (212).

* * * * *